(12) United States Patent
Ben-Yehezkel et al.

(10) Patent No.: US 9,742,578 B2
(45) Date of Patent: Aug. 22, 2017

(54) SIMPLE MESH NETWORK FOR WIRELESS TRANSCEIVERS

(71) Applicant: TEXAS INSTRUMENTS INCORPORATED, Dallas, TX (US)

(72) Inventors: Yoav Ben-Yehezkel, Natanya (IL); Avraham Baum, Giva't Shmuel (IL); Yaniv Tzoreff, Jerusalem (IL)

(73) Assignee: Texas Instruments Incorporated, Dallas, TX (US)

( * ) Notice: Subject to any disclaimer, the term of this patent is extended or adjusted under 35 U.S.C. 154(b) by 328 days.

(21) Appl. No.: 14/582,401

(22) Filed: Dec. 24, 2014

(65) Prior Publication Data

US 2016/0191259 A1 Jun. 30, 2016

(51) Int. Cl.
| | |
|---|---|
| H04L 29/06 | (2006.01) |
| H04L 12/741 | (2013.01) |
| H04W 72/04 | (2009.01) |
| H04L 12/18 | (2006.01) |
| H04W 72/00 | (2009.01) |
| H04W 84/12 | (2009.01) |
| H04W 88/08 | (2009.01) |
| H04W 8/26 | (2009.01) |
| H04W 12/02 | (2009.01) |

(52) U.S. Cl.
CPC ............ *H04L 12/189* (2013.01); *H04L 45/74* (2013.01); *H04L 69/22* (2013.01); *H04W 72/005* (2013.01); *H04W 72/0406* (2013.01); *H04W 72/0446* (2013.01); *H04W 8/26* (2013.01); *H04W 12/02* (2013.01); *H04W 84/12* (2013.01); *H04W 88/08* (2013.01)

(58) Field of Classification Search
CPC ....... H04L 12/189; H04L 45/74; H04L 69/22; H04W 12/00; H04W 72/005; H04W 72/0406; H04W 72/0446; H04W 8/26; H04W 12/02; H04W 84/12; H04W 88/08
See application file for complete search history.

(56) References Cited

U.S. PATENT DOCUMENTS

| | | | |
|---|---|---|---|
| 8,631,101 B2 * | 1/2014 | Shaffer | H04L 29/12254 709/220 |
| 2008/0310342 A1 | 12/2008 | Kruys et al. | |
| 2009/0279470 A1 * | 11/2009 | Seok | H04L 1/1685 370/312 |
| 2014/0036724 A1 | 2/2014 | Castagnoli | |
| 2014/0071850 A1 | 3/2014 | Abraham et al. | |
| 2014/0167622 A1 * | 6/2014 | Chobot | H05B 37/029 315/158 |

* cited by examiner

*Primary Examiner* — Melvin Marcelo
(74) *Attorney, Agent, or Firm* — Lawrence J. Bassuk; Charles A. Brill; Frank D. Cimino

(57) ABSTRACT

A method of operating a node of a network is disclosed. The method includes receiving a data frame having a header with plural addresses. The node determines if a first address of the plural addresses is an address of a descendant of the node and if a second address of the plural addresses is a parent address of the node. If so, the node changes a second address of the plural addresses to its own address in response to the step of determining. The node then transmits the data frame to at least one descendant of the node.

17 Claims, 6 Drawing Sheets

SIMPLE MESH NETWORK FOR WIRELESS TRANSCEIVERS

BACKGROUND OF THE INVENTION

The present embodiments relate to wireless network communication systems and, more particularly, to a simplified mesh network protocol that is backwards compatible with existing IEEE 802.11 standards.

A wireless network is a type of wireless communication system where at least one wireless transceiver must not only receive and process its own data, but it must also serve as a relay for other wireless transceivers in the network. The network may be a simple mesh network, a network range extender, or other comparable network system. This may be accomplished by a wireless routing protocol where a data frame is propagated within the network by hopping from transceiver to transceiver to transmit the data frame from a source node to a destination node. A wireless node may be a wireless access point (AP) such as a wireless router, a mobile phone, or a computer capable of accessing the wireless local area network (WLAN). In other applications, such as Internet of Things (IoT) applications, the wireless node may be an external security monitor, a room monitor, a fire or smoke detector, a weather station, or any number of other WLAN applications for home or business environments.

A practical mesh network must maintain continuous network paths for all wireless nodes. This requires reliable network formation, reconfiguration around broken or interrupted network paths, and prioritized routing to ensure that data frames travel from source to destination along short yet reliable network paths.

FIG. 1 shows an exemplary medium access control (MAC) header of the prior art that may be appended to IEEE 802.11 data frames for wireless network communication. The first three fields (Frame Control, Duration/ID, and Address 1) and the frame check sequence (FCS) field are present in all frames. The remaining fields are present only in certain frame types and subtypes of frames. The four address fields are used to indicate a basic service set identifier (BSSID), source address (SA), destination address (DA), transmitting station (STA) address (TA), and receiving STA address (RA).

Medium to large scale 802.11 compatible mesh networks use at least these four addresses to transmit standard, control, and management frames within the mesh. They are adapted to provide high capacity and bandwidth at the expense of power and protocol complexity. Many IoT nodes, however, communicate by relatively small frames without a need for high speed or bandwidth. They may have limited memory and computing power. Moreover, they may be battery operated so that power consumption is a significant concern.

Although network proposals of the prior art provide steady improvements in wireless network communications, the present inventors recognize that still further improvements in IoT mesh network protocol are possible. Accordingly, preferred embodiments described below are directed toward this and other improvements over the prior art.

BRIEF SUMMARY OF THE INVENTION

In a first preferred embodiment of the present invention, there is disclosed a method of operating a node of a network in a wireless communication system. The method includes receiving a downlink data frame having a header with plural addresses. The node determines if a first address of the plural addresses is a descendant address of the node and if a second address of the plural addresses is an address of a parent of the node. The node changes the second address to its own address in response to the step of determining and transmits the data frame to at least one descendant node.

In a second preferred embodiment of the present invention, there is disclosed a method of operating a node of a network in a wireless communication system. The method includes receiving an uplink data frame having a header with plural addresses and determining if a first address of the plural addresses is an address of the node. The node changes the first address to an address of the parent of the node in response to the step of determining and transmits the data frame to the parent of the node.

BRIEF DESCRIPTION OF THE SEVERAL VIEWS OF THE DRAWING

FIG. 4 is a diagram of a simple mesh network showing downlink (DL) communication with uplink acknowledgement (ACK);

DETAILED DESCRIPTION OF THE INVENTION

Figure 1:
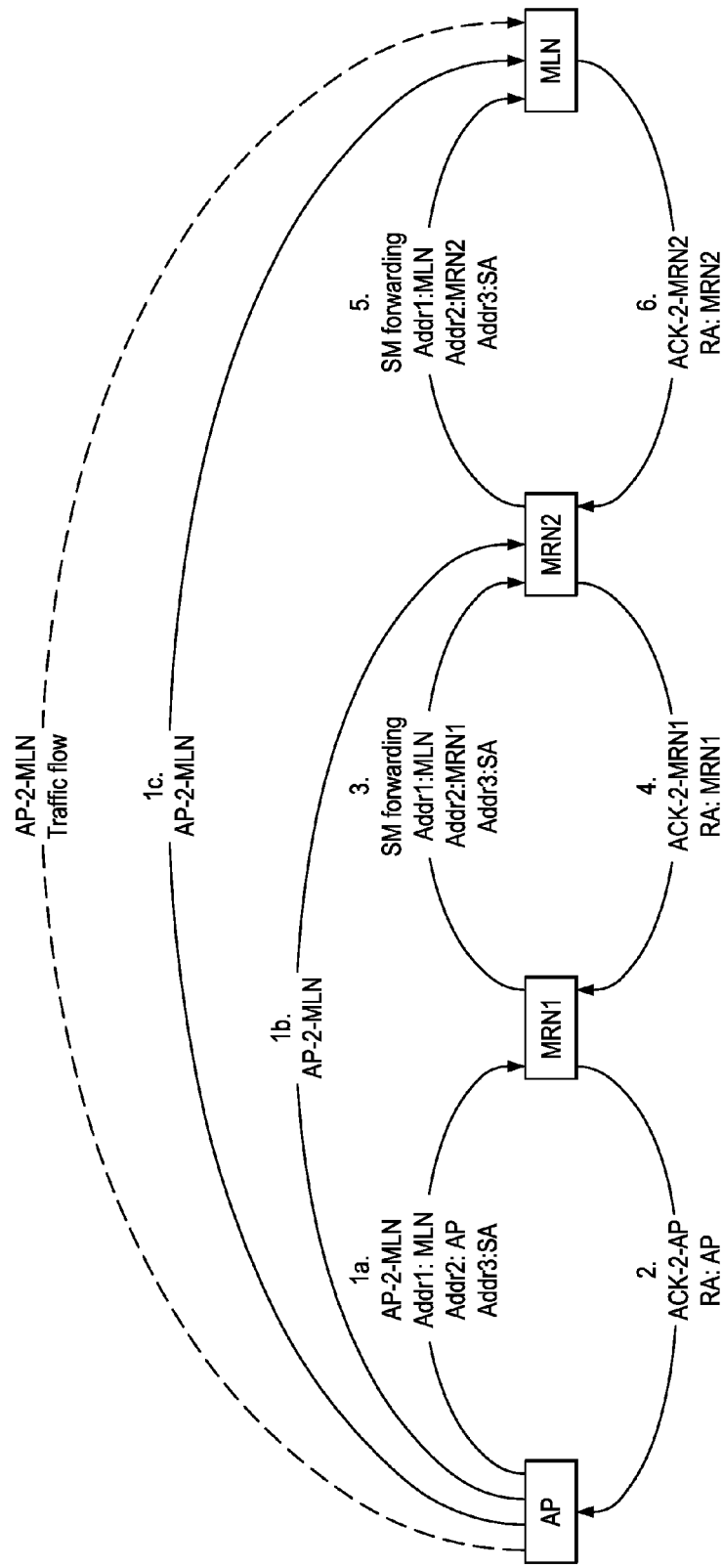
FIG. 1 is a diagram of an IEEE 802.11 medium access control (MAC) header of the prior art.
Figure 2:
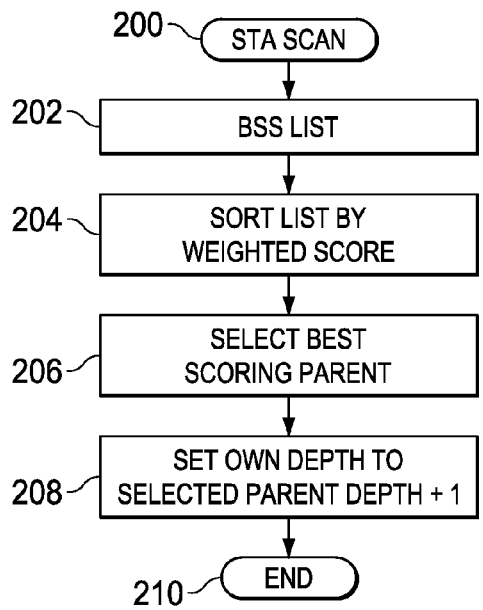
FIG. 2 is a flow diagram showing formation of a simple mesh network of the present invention.
Figure 6:
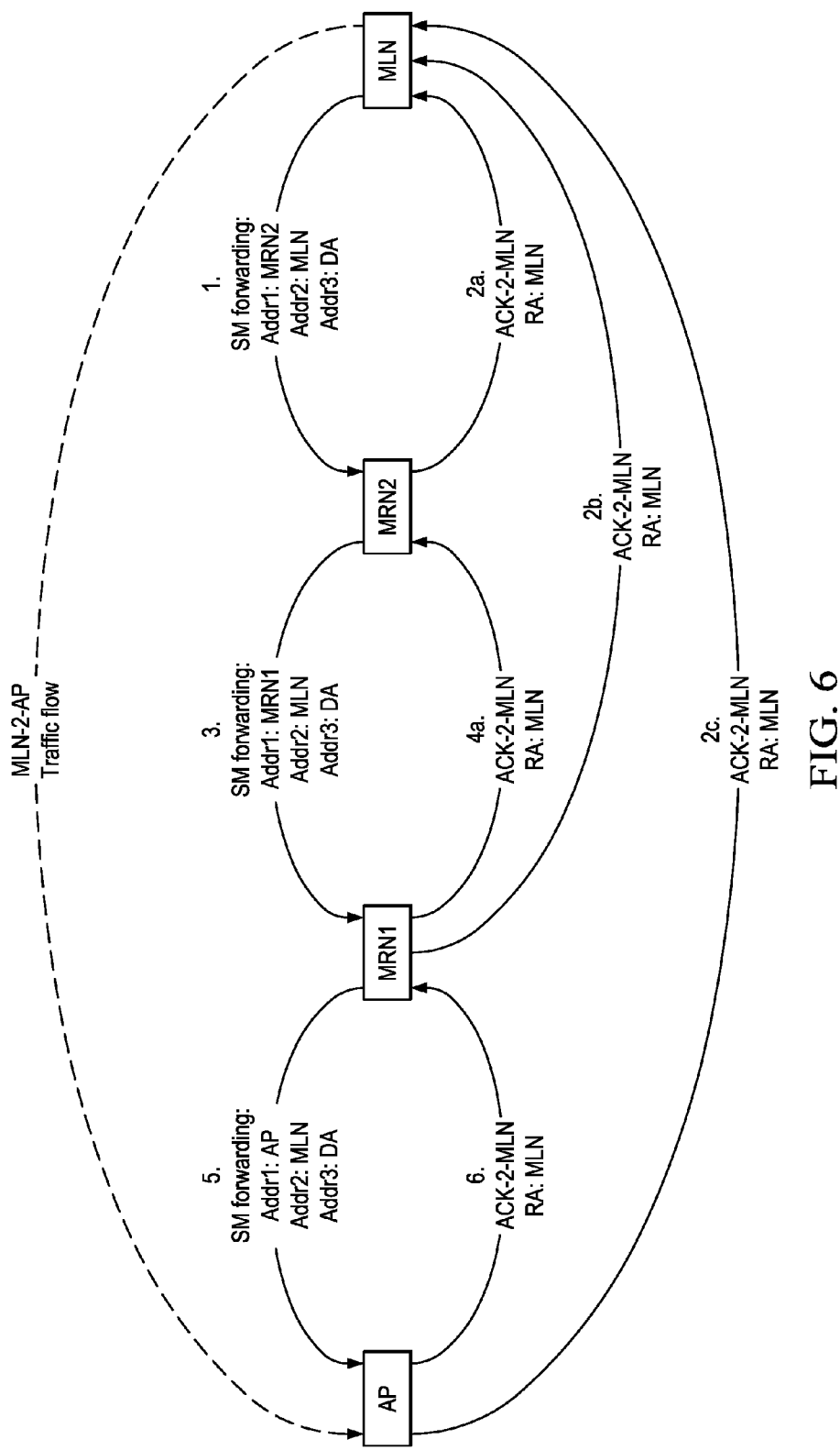
FIG. 6 is a diagram of a simple mesh network showing uplink (UL) communication with downlink acknowledgement (ACK)

Referring to FIG. 2, there is a flow diagram showing formation of a simple mesh network of the present invention as shown at FIGS. 4 and 6. Here and in the following discussion, the simple mesh network may be any network of wireless nodes to include range extenders or other wireless devices capable of entering the network. The simple mesh network is preferably formed from the access point (AP) down to each mesh repeater node (MRN1, MRN2) and mesh leaf node (MLN). The AP may be standard, proprietary, or other network node that provides internet access. The AP may also be connected to a wireless local area network (WLAN) for internet access. The process begins when a wireless node wishing to join the mesh initiates a station scan 200. The wireless node then receives a basic service set (BSS) list 202 indicating all wireless nodes that are currently in the mesh network. The wireless node sorts the BSS list by a weighted score such as signal strength 204 and selects the best scoring parent 206. The wireless node then joins the mesh as a descendant of the selected parent and sets its own depth to that of the selected parent plus 1.

Figure 3:
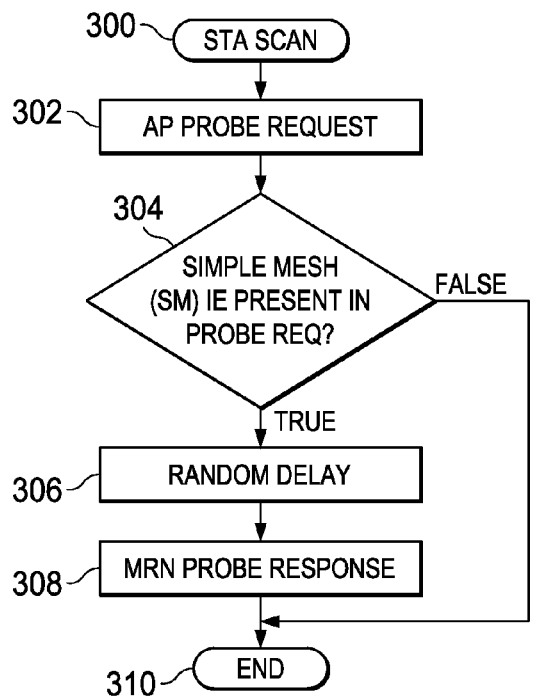
FIG. 3 is a flow diagram showing mesh discovery when a new wireless node enters a simple mesh network of the present invention.

Referring next to FIG. 3, there is a flow diagram showing mesh discovery when a new wireless node enters the wireless network of FIGS. 4 and 6. A wireless node wishing to enter an existing mesh will initiate a station scan 300 and send an AP probe request 302. Each MRN or MLN in the mesh that receives the probe request will determine a received signal strength indicator (RSSI) of the probe. The wireless node may determine if the RSSI is above an acceptable threshold and determine if an information element (IE) is present 304. If not, the process ends 310. If an IE is present, the wireless node will wait a respective random delay period 306 and send a probe response 308 similar to an AP probe response. The random delay reduces the risk of probe response collisions due to a high probability of a short-term initiated hidden node effect from multiple responders or that the subsequent MRN probe response 308 will collide with a delayed AP response. The wireless node selects the AP or MRN with the best score. When the wireless node sends its authentication through an MRN, the MRN registers the wireless node in the mesh. The selected AP or MRN may then announce the registration throughout the mesh to avoid multiple registrations.

Turning now to FIG. 4, there is a diagram of a simple mesh network of the present invention showing downlink (DL) communication with uplink acknowledgement (ACK). The diagram is simplified for the purpose of illustration. One of ordinary skill in the art having access to the instant application will appreciate that many more mesh relay nodes (MRN) and mesh leaf nodes (MLN) are possible in a practical network. The simple mesh network illustrates several possible communication paths between the access point (AP) and network nodes or descendants. The AP may also be connected to a wireless local area network (WLAN) for internet access. In a first path 1a, the AP communicates directly with mesh relay node MRN1, and communication is directly acknowledged (ACK) over path 2. In a second path 1b, the AP communicates directly with mesh relay node MRN2, and communication is indirectly acknowledged via sequential paths 4 and 2. In a third path 1c, the AP communicates directly with mesh leaf node MLN, and communication is indirectly acknowledged via sequential paths 6, 4, and 2. In each case, the BSSID is set to the immediate parent address, so that a destination node will only acknowledge frames received directly from its parent. In addition, the receiving destination node (MRN or MLN) will only acknowledge (ACK) receipt of frames with ADDR1 set to the address of a registered descendant node or of its own station (STA) address. This advantageously avoids collisions between acknowledgements to multiple ancestors.

Figure 5:
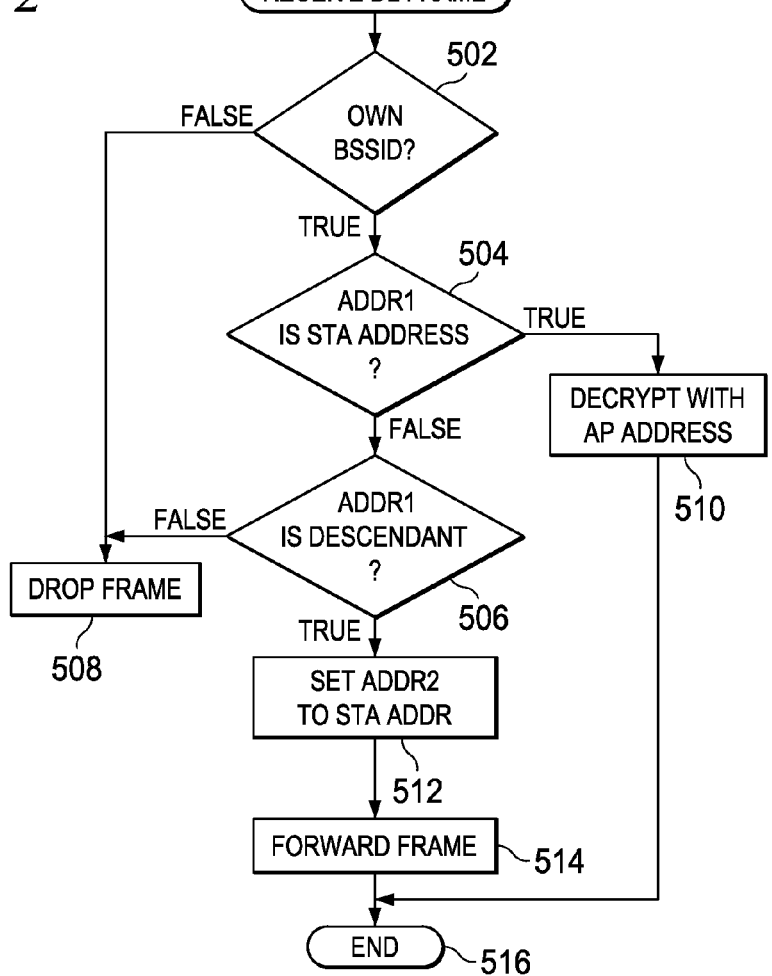
FIG. 5 is a flow diagram showing operation of the simple mesh network of FIG. 4.

Operation of the simple mesh network of FIG. 4 will now be explained with reference to the flow diagram of FIG. 5. As previously discussed, downlink (DL) transmission may follow direct paths or indirect paths through relay nodes. Indirect communication according to the present invention is greatly simplified with regard to existing 802.11 standards by modification of a single address at each relay node. In operation, a DL frame is first received at step 500 from the AP by MRN1 (1a). The destination address DA (ADDR1) is points to MLN. The parent address (ADDR2) points to AP, and ADDR3 is set to source address SA. MRN1 determines from a basic service set identification (BSSID) address in ADDR2 whether the frame originated from a node of its basic service set (BSS) 502. If not, the frame is ignored or dropped at step 508. If the frame originated within the BSS, however, MRN1 determines at step 504 if it is the final destination node by comparing ADDR1 to its station (STA) address. If MRN1 were the final destination node and the frame is encrypted, MRN1 would decrypt the frame using the access point (AP) address 510. Since ADDR1 points to MLN, MRN1 does not retain the frame. MRN1 determines at step 506 if ADDR1 is a valid descendant address. ADDR1 points to MLN, which is a registered descendant of MRN1. Thus, MRN1 changes ADDR2 (BSSID) to its own address 512 and transmits or forwards the frame 514 to at least one descendant node. MRN1 constructs an acknowledgement (ACK) frame and sets the receiving station address (RA) to AP. MRN1 transmits the ACK to AP (2). The first transmission is then completed at step 516.

The process is repeated at node MRN2. The DL frame is received at step 500 from the MRN1 by MRN2 (3). The destination address DA and source address SA remain unchanged. ADDR2 (BSSID) now points to MRN1. MRN2 determines from the BSSID that the frame originated from a node of its BSS 502. The frame originated within the BSS, so MRN2 determines at step 504 that it is not the final destination node by comparing ADDR1 to its own STA address. If MRN2 were the final destination node and the frame is encrypted, MRN2 would decrypt the frame using the access point (AP) address as the BSSID input to the decryption procedure 510. Since ADDR1 points to MLN, MRN2 does not retain the frame. MRN2 determines at step 506 that ADDR1 (MLN) is a valid descendant address. Thus, MRN2 changes ADDR2 (BSSID) to its own address 512 and transmits or forwards the frame 514 to MLN. MRN2 constructs an ACK frame and sets RA to MRN1. MRN2 transmits the ACK to MRN1 (4). The second transmission is then completed at step 516.

The final transmission is completed when the DL frame is received at step 500 from the MRN2 by MLN (5). The destination address DA and source address SA remain unchanged. ADDR2 (BSSID) now points to MRN2. MLN determines from the BSSID that the frame originated from a node of its BSS 502. The MLN determines at step 504 that it is the final destination node by comparing ADDR1 to its own STA address. If the frame is encrypted, MLN decrypts the frame using the access point (AP) address 510 as the BSSID input to the decryption process before processing the frame. MLN constructs an ACK frame and sets RA to MRN2. MLN transmits the ACK frame to MRN2 (6). The final transmission is then completed and ends at step 516.

There are several advantages of the present simple mesh network over existing 802.11 standards. First, mesh network simplicity is maintained by a one-to-many or many-to-one distribution system (DS). This is particularly advantageous for "small footprint" IoT devices having limited computational power and memory. Second, each MRN maintains a flat list of existing descendants and acts as a virtual AP to the descendants. Therefore, there is no need for the MRN to maintain knowledge of how the descendants are arranged. Third, each relay node forwards DL frames to all its descendants with its own address set in the BSSID (ADDR2) rather than the AP as in the 802.11 standard. This ensures that only the correct mesh routing path along the tree is followed. Fourth, no manipulation in the middle of frames, such as adding a fourth address as with 802.11, is required. This avoids a need to copy parts of a frame or reallocate resources. Fifth, frame encryption and address verification assure end-to-end security from the AP to the MLN. Sixth, no special mesh routing messages are required. Seventh, backwards compatibility is maintained such that existing BSS deployments operated by any standard AP can benefit from a simple mesh solution. Finally, inherent network simplicity reduces computational overhead, computation time, and power at each relay node.

FIG. 6 is a diagram of a simple mesh network of the present invention showing uplink (UL) communication with downlink acknowledgement (ACK). The diagram is simplified for the purpose of illustration. The simple mesh network illustrates several possible communication paths between the access point (AP) and network nodes or descendants. In a first path 1, MLN communicates directly with mesh relay node MRN2, and communication is directly acknowledged (ACK) over path 2a. In a second path 1/3, MLN communicates indirectly with mesh relay node MRN1 via MRN2, and communication is either directly acknowledged from MRN1 to MLN over path 2B or indirectly acknowledged via sequential paths 4a and 2a. In a third path 1/3/5, MLN communicates indirectly with the AP, and communication is either directly acknowledged from AP to MLN over path 2c or indirectly acknowledged via some combination of sequential paths 6, 4a, and 2a-2c.

Figure 7:
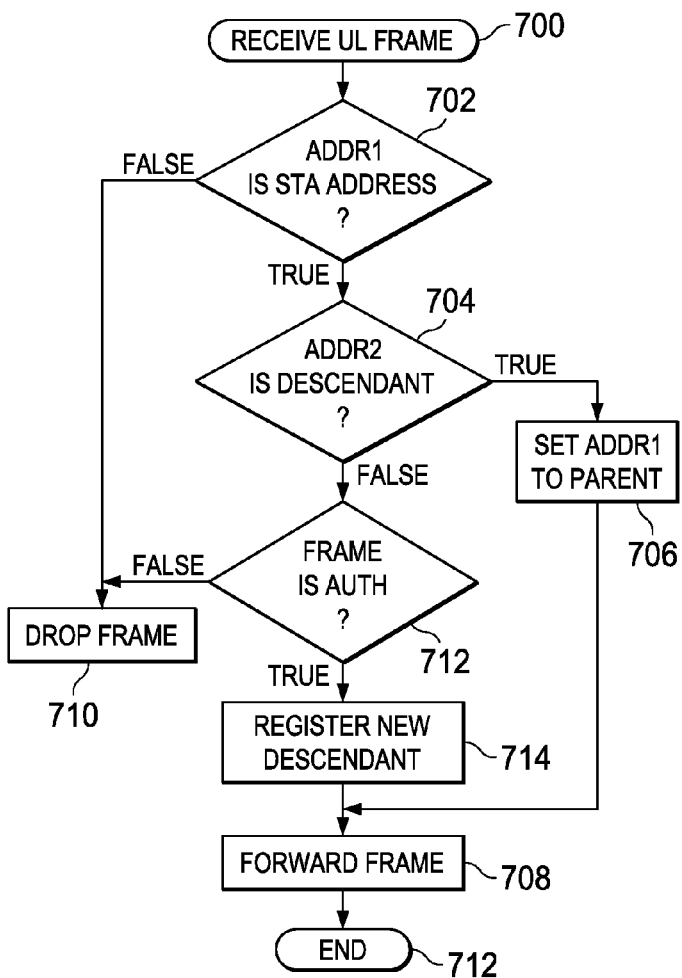
FIG. 7 is a flow diagram showing operation of the simple mesh network of FIG. 6.

Operation of the simple mesh network of FIG. 6 will now be explained with reference to the flow diagram of FIG. 7. As previously discussed, uplink (UL) transmission may follow direct paths or indirect paths through relay nodes. Indirect communication according to the present invention is greatly simplified with regard to existing 802.11 standards by modification of a single address at each relay node. In operation, a UL frame is first received at step 700 from MLN by MRN2 over path 1. The parent address ADDR1 (BSSID) points to MRN2. The source address (ADDR2) is set to MLN, and ADDR3 is set to destination address DA. MRN2 determines at step 702 if the frame is from a descendant by comparing ADDR1 to its station (STA) address, which is MRN2. For security and connection purposes, MRN2 determines at step 704 if ADDR2 is a valid descendant. If not, MRN2 determines if the frame is authentication (AUTH) 712. If not AUTH, MRN2 drops the frame 710. Otherwise, MRN2 registers a new descendant 714 and forwards the UL frame 708. If, however, ADDR2 is a registered descendant 704 or an authentication frame, MRN2 changes ADDR1 (BSSID) to its parent address MRN1 (BSSID) 706 and transmits or forwards the frame 708 to its parent node. MRN2 constructs an acknowledgement (ACK) frame and sets the receiving station address (RA) to MLN. MRN2 transmits the ACK to MLN (2a). The first UL transmission is then completed at step 712.

The process is repeated when the UL frame is received at step 700 from MRN2 by MRN1 (3). The destination address DA and source address SA remain unchanged. ADDR1 (BSSID) now points to MRN1. MRN1 determines from the BSSID (ADDR1) that it is the proper recipient 702. For security and connection purposes, MRN1 determines at step 704 if ADDR2 is a valid descendant. If not, MRN1 determines if the frame is AUTH 712. If not AUTH, MRN1 drops the frame 710. Otherwise, MRN1 registers a new descendant 714 and forwards the UL frame 708. If, however, ADDR2 is a registered descendant 704 or authentication frame, MRN1 changes ADDR1 (BSSID) to its parent address AP (BSSID) 706 and transmits or forwards the frame 708 to its parent node. MRN1 constructs an ACK frame and sets RA to MRN2. MRN1 may transmit the ACK frame directly to MLN (2b). A depth is included in the frame so that an ACK frame received from other than a parent node is ignored. The second UL transmission is then completed at step 710.

The final UL transmission is repeated when the UL frame is received at step 700 from MRN1 by the AP (5). The destination address DA and source address SA remain unchanged. ADDR1 (BSSID) now points to the AP. The AP determines from the BSSID (ADDR1) that it is the proper recipient 702. The AP then forwards the UL frame to the wireless local area network (WLAN). The AP constructs an ACK frame and sets RA to MLN. The AP may transmit the ACK frame directly to MLN (2c). A depth is included in the frame so that an ACK frame received from other than a parent node is ignored.

The previously discussed advantages with respect to DL communication are also present in UL communication. First, mesh network simplicity is maintained by a one-to-many or many-to-one distribution system (DS). This is particularly advantageous for "small footprint" IoT devices having limited computational power and memory. Second, each MRN maintains a flat list of existing descendants and acts as a virtual AP to the descendants. Therefore, there is no need for the MRN to maintain knowledge of how the descendants are arranged. Third, each relay node forwards UL frames to its parent with the parent address set in the BSSID (ADDR1) rather than the AP as in the 802.11 standard. This ensures that only the correct mesh routing path along the tree is followed. Fourth, no manipulation in the middle of frames, such as adding a fourth address as with 802.11, is required. This avoids a need to copy parts of a frame or reallocate resources. Fifth, frame encryption and address verification assure end-to-end security from the MLN to the AP. Sixth, no special mesh routing messages are required. New descendants are registered using standard AUTH management frames. Seventh, backwards compatibility is maintained such that existing BSS deployments operated by any standard AP can benefit from a simple mesh solution. Finally, inherent network simplicity reduces computational overhead, computation time, and power at each relay node.

Figure 8:
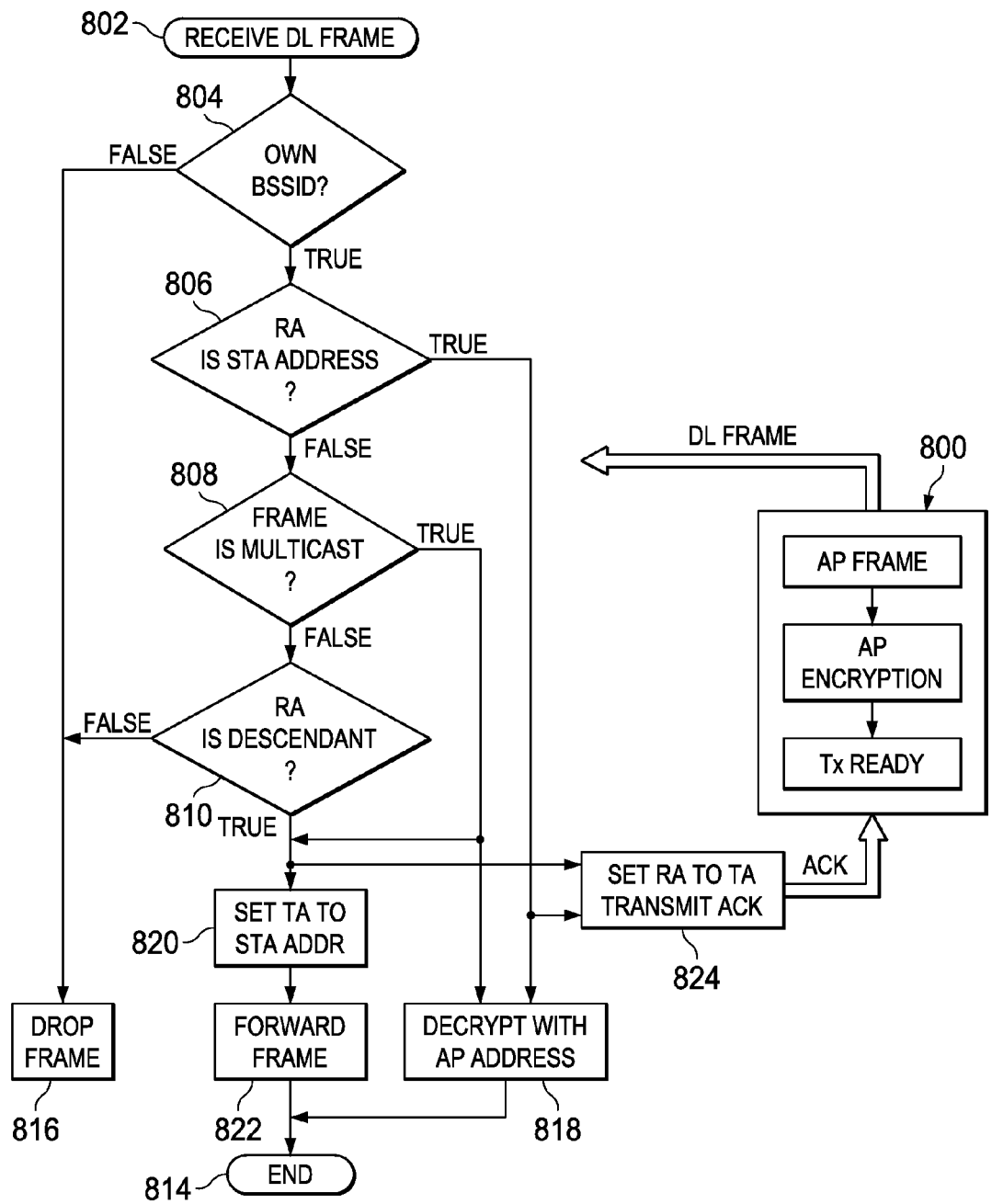
FIG. 8 is a flow diagram showing operation of the simple mesh network when receiving a unicast or multicast downlink (DL) frame.

Referring next to the flow diagram of FIG. 8, operation of the simple mesh network of FIG. 4 will now be explained with a unicast or multicast DL transmission. As previously discussed, downlink (DL) transmission may follow direct paths or indirect paths through relay nodes. Indirect communication according to the present invention is greatly simplified with regard to existing 802.11 standards by modification of a single address at each relay node. In operation, access point (AP) 800 receives a DL frame from a wireless local area network (WLAN). AP 800 encrypts the frame using the AP address as the BSSID input for the encryption procedure and transmits the DL frame. A wireless simple mesh node receives the DL frame 802 and determines from a basic service set identification (BSSID) address whether the frame originated from a node of its basic service set (BSS) 804. If not, the frame is ignored or dropped at step 816. If the frame originated within the BSS, the node determines at step 806 if it is the final destination node by comparing receive address (RA) to its station (STA) address. If the node is the final destination, it decrypts the DL frame with the AP address 818 and retains the decrypted frame 814. The node also constructs an acknowledgement (ACK) frame and sets the receive address RA to the transmit address (TA) 824. The node then transmits the ACK frame to the TA address.

The node determines if the DL frame is a multicast frame at step 806. If so, the node decrypts the DL frame using the AP address 818 rather than the BSSID as an input to the decryption procedure. The node also sets the DL frame transmit address (TA) to its own station (STA) address 820 and transmits or forwards the frame 822 to at least one descendant node. The process is then completed at step 814.

If the node is not the final recipient, the node determines at step 810 if RA is a registered descendant node address. If not, the node drops or ignores the frame 816. If, however, RA is an address of a registered descendant, the node constructs an acknowledgement (ACK) frame and sets the receive address RA to the transmit address (TA) 824. The node then transmits the ACK frame to the TA address. The node also sets the DL frame transmit address (TA) to its own station (STA) address 820 and transmits or forwards the frame 822 to at least one descendant node. The process is then completed at step 814.

Figure 9:
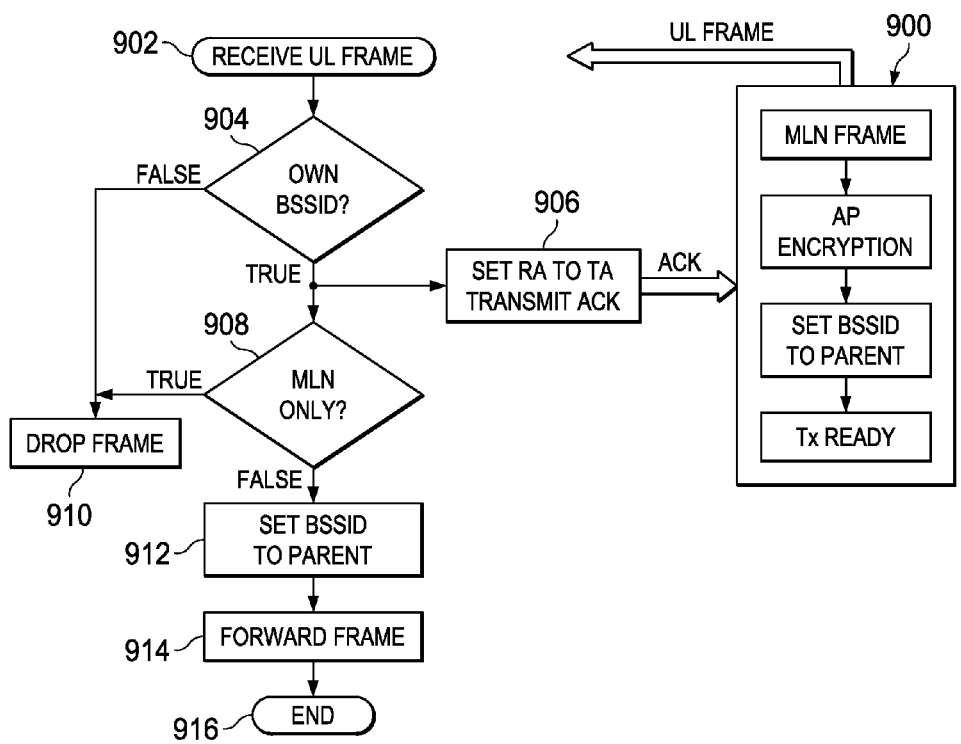
FIG. 9 is a flow diagram showing operation of the simple mesh network when transmitting a unicast uplink (UL) frame.

FIG. 9 is a flow diagram showing operation of the simple mesh network of FIG. 6 with a unicast UL transmission. As previously discussed, uplink (UL) transmission may follow direct paths or indirect paths through relay nodes. Indirect communication according to the present invention is greatly simplified with regard to existing 802.11 standards by modification of a single address at each relay node. In operation, MLN 900 constructs an uplink (UL) frame and encrypts the frame using the AP address as the BSSID input for the encryption procedure. The MLN sets the BSSID to its parent address and transmits the UL frame. A wireless simple mesh node receives the UL frame 902 and determines from a basic service set identification (BSSID) address whether the frame originated from a node of its basic service set (BSS) 904. If not, the frame is ignored or dropped at step 910. If the frame originated within the BSS, however, the node also constructs an acknowledgement (ACK) frame and sets the receive address RA to the transmit address TA 906. The node then transmits the ACK frame to the originating node. The node may determine if it is only a mesh leaf node (MLN) and not a relay node. If so, it drops the frame 910. If not, the node sets the BSSID to its parent address 912 and forwards the UL frame 914. The process is then completed at step 916.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of operating a node of a network, comprising the steps of:
   receiving a data frame having a header with plural sequential addresses;
   determining if a second sequential address of the plural addresses is an address of a parent of the node;
   changing the second sequential address to an address of the node in response to the step of determining;
   transmitting the data frame to at least one descendant of the node;
   setting a recipient address of an acknowledgement frame to an address of the parent of the node; and
   transmitting the acknowledgement frame to the parent of the node.

2. A method as in claim 1, comprising determining if a first sequential address of the plural addresses is an address of the node.

3. A method as in claim 1, comprising determining if a first sequential address of the plural addresses is an address of a descendant node.

4. A method as in claim 1, wherein the node only acknowledges receipt of a data frame from its immediate parent.

5. A method as in claim 1, wherein the step of receiving comprises receiving a downlink frame.

6. A method as in claim 5, wherein the downlink frame is encrypted, and wherein a final destination node decrypts the downlink frame with an access point (AP) address.

7. A method of operating a node of a network, comprising the steps of:
   receiving a data frame having a header with plural sequential addresses;
   determining if a first sequential address of the plural addresses is an address of the node;
   changing the first sequential address to an address of a parent of the node in response to the step of determining;
   transmitting the data frame to the parent of the nod;
   setting a recipient address of an acknowledgement frame to an address of a descendant of the node; and
   transmitting the acknowledgement frame to the descendant of the node.

8. A method as in claim 7, comprising determining if a second sequential address of the plural addresses is a descendant of the node.

9. A method as in claim 8, comprising registering a new descendant if the second sequential address is not an address of a descendant of the node.

10. A method as in claim 7, wherein the acknowledgement frame includes depth bits to indicate the depth of the node.

11. A method as in claim 7, wherein the step of receiving comprises receiving an uplink frame.

12. A method as in claim 11, wherein the uplink frame is encrypted with an access point (AP) address as a basic service set identification (BSSID) input for encryption.

13. A method of operating a node of a network, comprising the steps of:
   receiving a data frame having a header with plural addresses;
   determining if the frame is in the node's basic service set;
   determining if a receive address (RA) of the frame is a descendant of the node;
   changing a transmit address (TA) of the frame to an address of the node in response to the step of determining if a receive address (RA) of the frame is a descendant of the node;
   transmitting the data frame;
   determining if a receive address (RA) is an address of the node;
   changing RA to a transmit address (TA) of an acknowledgement frame in response to the step of determining if a receive address (RA) is an address of the node; and
   transmitting the acknowledgement frame to the parent of the node.

14. A method as in claim 13, comprising:
   determining that the data frame is a multicast frame; and
   transmitting the multicast frame.

15. A method as in claim 13, comprising:
   determining if RA is a descendant of the node;
   changing a transmit address (TA) of the data frame to an address of the node in response to the step of determining if RA is a descendant of the node; and
   transmitting the data frame to at least one descendant of the node.

16. A method as in claim 13, wherein the data frame is one of a unicast and a multicast data frame.

17. A method as in claim 13, comprising:
   receiving an uplink (UL) data frame having a header with plural addresses;
   determining if the UL frame is in the node's basic service set;
   changing a basic service set identification of the UL frame to an address of a parent of the node; and
   transmitting the UL frame to the parent of the node.

* * * * *